(12) United States Patent
Oh

(10) Patent No.: US 6,176,787 B1
(45) Date of Patent: Jan. 23, 2001

(54) TRIPOD CONSTANT VELOCITY JOINT

(75) Inventor: Seung Tak Oh, Chang-won shi (KR)

(73) Assignee: Kia Heavy Industries Corporation (KR)

(*) Notice: Under 35 U.S.C. 154(b), the term of this patent shall be extended for 0 days.

(21) Appl. No.: 09/206,590

(22) Filed: Dec. 7, 1998

(30) Foreign Application Priority Data

Apr. 29, 1998 (KR) .................................... 98-6912

(51) Int. Cl.[7] ...................................... F16D 3/26
(52) U.S. Cl. ........................ 464/111; 464/132; 464/905
(58) Field of Search ...................... 464/111, 112, 464/120, 122, 123, 128, 132, 905

(56) References Cited

U.S. PATENT DOCUMENTS 4,786,270 * 11/1988 Iwasaki ................................ 464/111
5,474,500 * 12/1995 Girguis ................................ 464/111

* cited by examiner

Primary Examiner—Anthony Knight
Assistant Examiner—Kenneth Thompson
(74) Attorney, Agent, or Firm—Galgano & Burke (57) ABSTRACT

A tripod type constant velocity joint is disclosed. A tripod housing defines an opening, and is formed with three track grooves which are communicated with the opening and are uniformly spaced apart from one another in a circumferential direction. Each track groove has a contact groove formed in a side wall section thereof, and the contact groove has a bottom wall part which defines a guide surface. A spider is disposed in the opening of the tripod housing. The spider has three trunnions which project from an outer surface thereof to be inserted into the three track grooves, respectively. Three pairs of a needle roller, a spherical roller and a cylindrical roller are sequentially and diametrically fitted around the three trunnions of the spider, respectively. One portion of the guide surface of the contact groove is lengthened at its upper end and the other portion of the guide surface of the contact groove is lengthened at its lower end, such that the cylindrical roller comes into contact with the contact groove only at two contact points.

5 Claims, 7 Drawing Sheets

Fig. 1

-PRIOR ART-

Fig. 2

-PRIOR ART-

Fig. 3

-PRIOR ART-

Fig. 4

-PRIOR ART-

Fig. 5

—PRIOR ART—

Fig. 10

TRIPOD CONSTANT VELOCITY JOINT

BACKGROUND OF THE INVENTION

1. Field of the Invention

The present invention relates to a tripod type constant velocity joint mounted to drive axles of a car for transmitting power to drive wheels, and more particularly, the present invention relates to a tripod type constant velocity joint which can reduce frictional resistance generated between a tripod housing and a cylindrical roller which are in contact with each other.

2. Description of the Prior Art

Generally, a constant velocity joint is mounted to drive axles connected to a final reduction gear in a front wheel drive car or a four wheel drive car and functions to transmit power to drive wheels. The constant velocity joint can transmit power due to the fact that a contact point between a drive shaft and a driven shaft exists on a line which bisects an angle between them.

A constant velocity joint consists of a sliding joint, a shaft and a fixed joint. The sliding joint is used for absorbing displacements in X and Y directions in a car, and examples of the sliding joint include a tripod type joint, a double offset type joint, a cross groove type joint, etc. The fixed joint is used for absorbing a steering angle of the car, and examples of the fixed joint include a Rzeppa type joint, a Birfield type joint, etc.

The present invention is concerned with a tripod type constant velocity joint, and therefore, a construction of a tripod type constant velocity joint of the prior art will be described hereinafter with reference to FIGS. 1 through 5.

Figure 1:
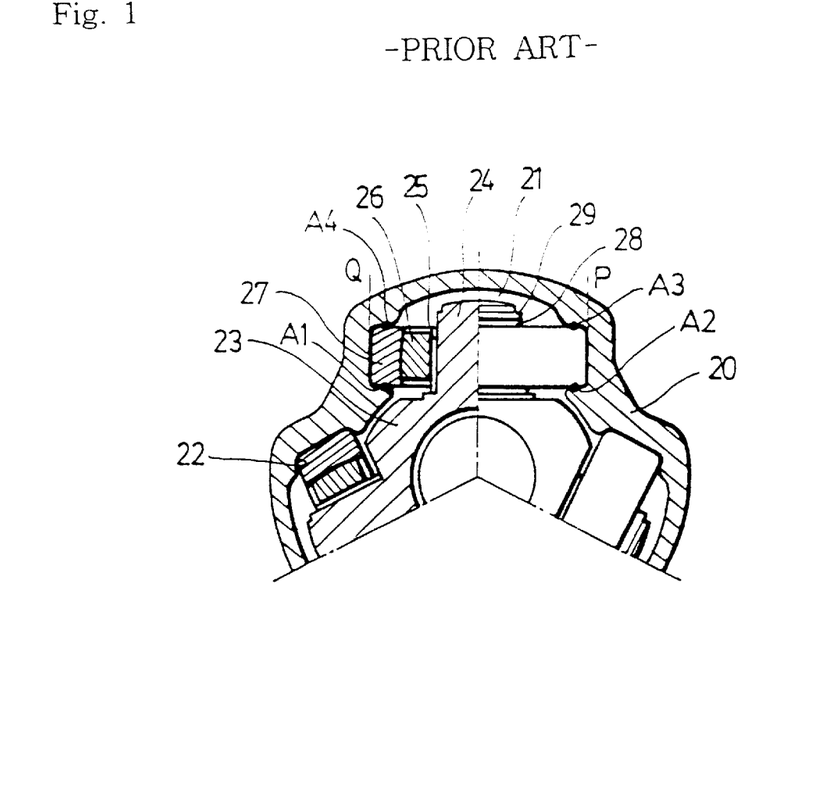
FIG. 1 is a cross-sectional view of a tripod type constant velocity joint of the prior art.
Figure 2:
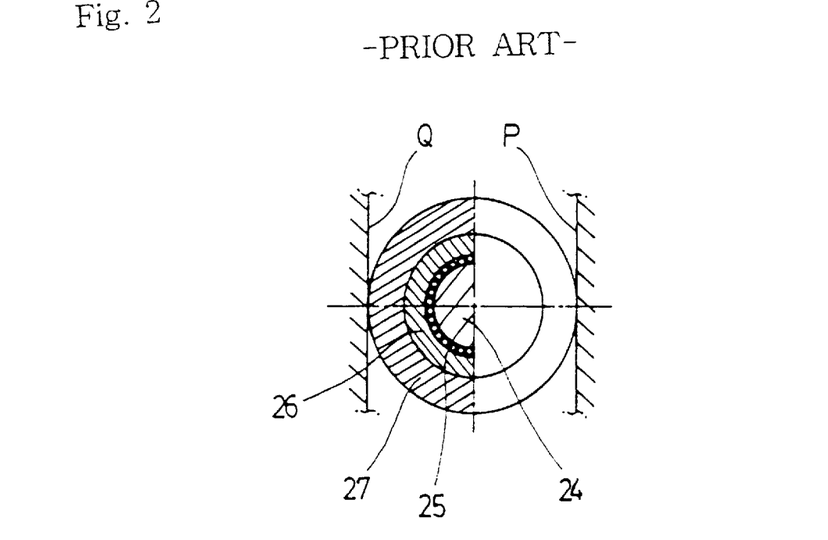
FIG. 2 is a transverse sectional view of the tripod type constant velocity joint of FIG. 1.
Figure 3:
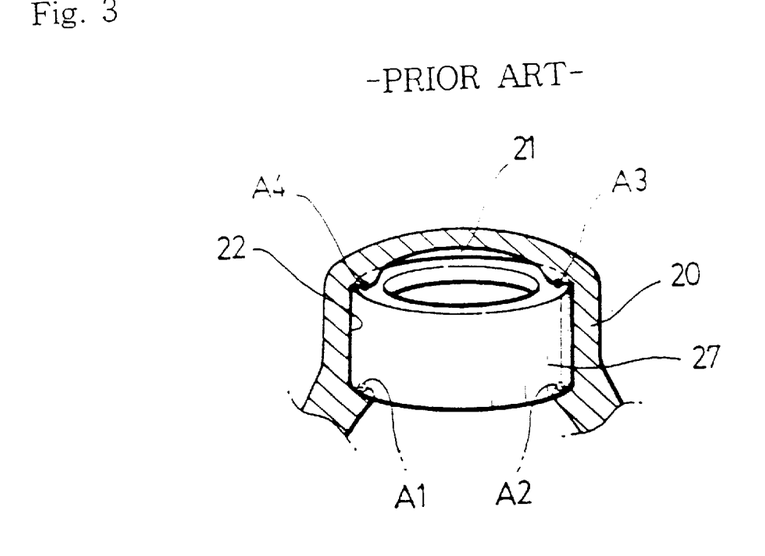
FIG. 3 is a perspective view illustrating main components of the joint of FIG. 1.

A tripod type constant velocity joint mounted to drive axles connected to a final reduction gear in a car for transmitting power to drive wheels, as shown in FIGS. 1 through 3, includes a tripod housing 20 which defines an opening. The tripod housing 20 is formed with three track grooves 21 which are communicated with the opening and are uniformly spaced apart from one another in a circumferential direction. Each track groove 21 has a contact groove 22 formed in a side wall section thereof. The contact groove 22 has a bottom wall portion which defines a pair of guide surfaces P and Q which are parallel to each other. A spider 23 is disposed in the opening of the tripod housing 20 and has three trunnions 24 which project from an outer surface thereof to be inserted into the three track grooves 21, respectively. Three pairs of a needle roller 25, a spherical roller 26 and a cylindrical roller 27 are sequentially and diametrically fitted around the three trunnions 24 of the spider 23, respectively. By this, the cylindrical roller 27 is engaged into the contact groove 22. A striker-out 28 and a retainer ring 29 are locked to a threaded portion of each trunnion 24 above the needle roller 25. The striker-out 28 and the retainer ring 29 prevent the cylindrical roller 27 from being released.

In the tripod type constant velocity joint constructed as mentioned above, when the joint is rotated at a certain joint angle, the cylindrical roller 27 engaged into the contact groove 22 defined in the track groove 21 of the tripod housing 20 is rolled on the pair of guide surfaces P and Q of the contact groove 22, and at the same time, the spherical roller 26 absorbs an aligning movement of the cylindrical roller 27.

On the other hand, the cylindrical roller 27 is moved along the pair of guide surfaces P and Q of the contact groove 22 of the tripod housing 20 upon rolling as described above.

Figure 4:
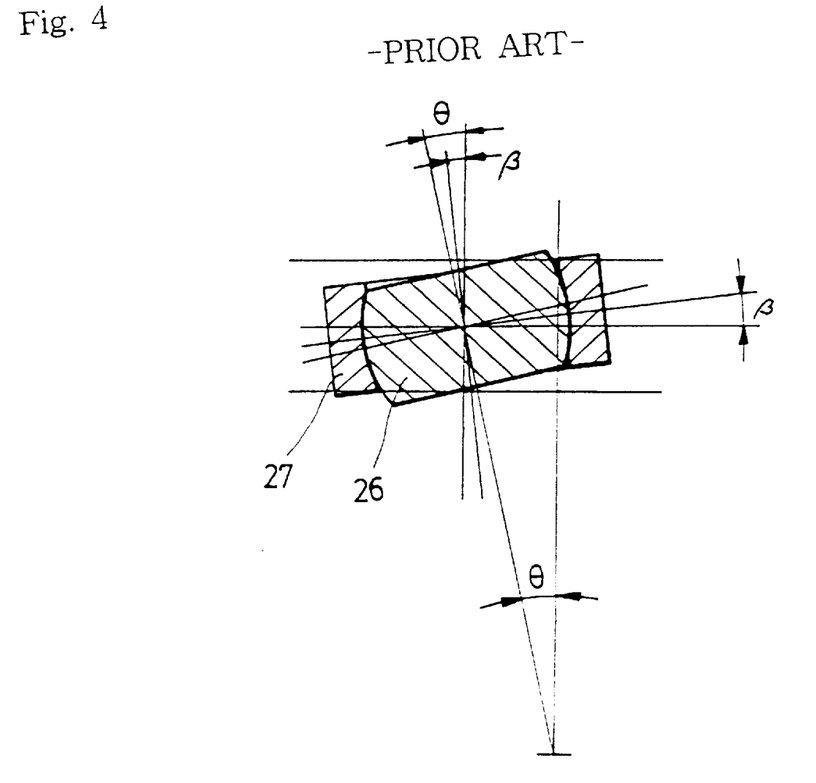
FIG. 4 is a cross-sectional view illustrating a state in which a spherical roller and a cylindrical roller are operated.

According to this, as shown in FIG. 4, it is possible to control a direction over a specified angle $\beta$.

However, the tripod type constant velocity joint of the prior art suffers from defects in that since an upper end surface and a lower end surface of the cylindrical roller 27 are in contact with all of a left lower end contact point A1, a right lower end contact point A2, a right upper end contact point A3 and a left upper end contact point A4 formed in the contact groove 22 of the tripod housing 20 while performing a direction control over the specified angle $\beta$, a great deal of frictional resistance is generated between the cylindrical roller 27 and the tripod housing 20.

Figure 5:
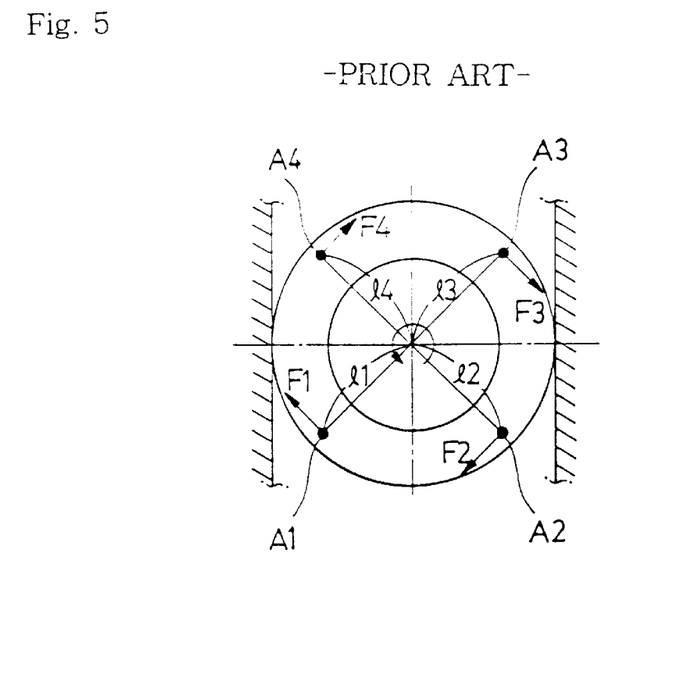
FIG. 5 is a schematic plan view for explaining a rotational friction force generated between a tripod housing and the cylindrical roller.

In other words, in the tripod type constant velocity joint as shown in FIG. 5, when assuming that $F_1$, $F_2$, $F_3$, and $F_4$ are frictional resistance at the contact points A1, A2, A3 and A4, respectively, and $l_1$, $l_2$, $l_3$, and $l_4$ are distances from a center of the cylindrical roller 27 to the contact points A1, A2, A3 and A4, respectively, since the upper end surface and the lower end surface of the cylindrical roller 27 are in contact with all contact points A1, A2, A3 and A4 formed in the contact groove 22, rotational friction moment $M_4$ of the cylindrical roller 27 is described by $M_4 = F_1 l_1 + F_2 l_2 + F_3 l_3 + F_4 l_4$, whereby the frictional resistance cannot but be increased.

SUMMARY OF THE INVENTION

Accordingly, the present invention has been made in an effort to solve the problems occurring in the prior art, and an object of the present invention is to provide a tripod type constant velocity joint which can reduce frictional resistance generated between a cylindrical roller and a contact groove of a tripod housing while the cylindrical roller is rolled over, thereby to be reliably operated.

In order to achieve the above object, according to the present invention, an extended portion is formed at a contact groove, or an inclined portion or a projected portion is formed on a cylindrical roller, such that the cylindrical roller comes into contact with the contact groove only at two contact points.

BRIEF DESCRIPTION OF THE DRAWINGS

The above objects, and other features and advantages of the present invention will become more apparent after a reading of the following detailed description when taken in conjunct with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

A tripod type constant velocity joint of the present invention includes a tripod housing 20 which defines an opening. The tripod housing 20 is formed with three track grooves 21 which are communicated with the opening and are uniformly spaced apart from one another in a circumferential direction. Each track groove 21 has a contact groove 22 formed in a side wall section thereof. The contact groove 22 has a bottom wall portion which defines a pair of guide surfaces P and Q which are parallel to each other. A spider 23 is disposed in the opening of the tripod housing 20 and has three trunnions 24 which project from an outer surface thereof to be inserted into the three track grooves 21, respectively. Three pairs of a needle roller 25, a spherical roller 26 and a cylindrical roller 27 are sequentially and diametrically fitted around the three trunnions 24 of the spider 23, respectively. By this, the cylindrical roller 27 is engaged into the contact groove 22. A striker-out 28 and a retainer ring 29 are locked to a threaded portion of each trunnion 24 above the needle roller 25. The striker-out 28 and the retainer ring 29 prevent the cylindrical roller 27 from being released.

Specifically, in the present invention, the cylindrical roller 27 comes into contact with the contact groove 22 at two contact points.

Figure 6:
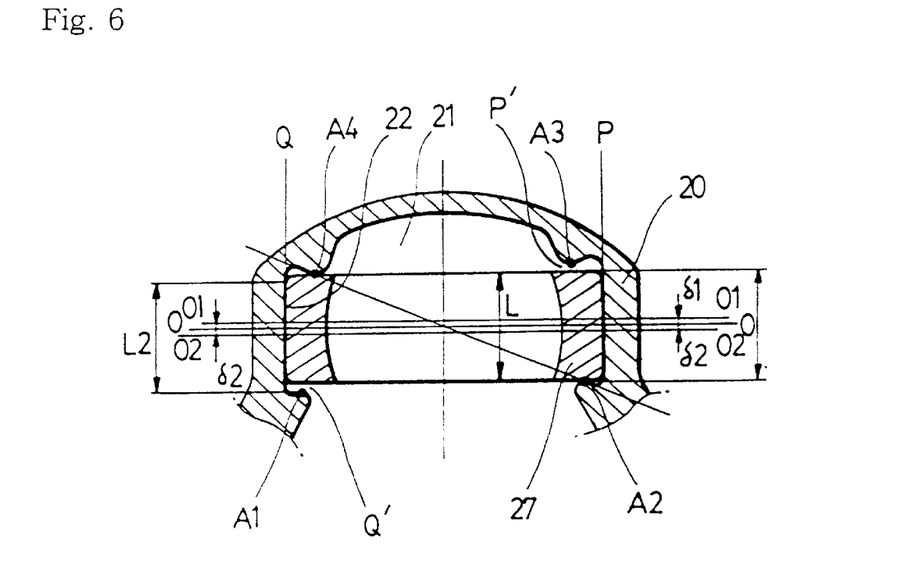
FIG. 6 is a cross-sectional view of a tripod type constant velocity joint in accordance with a first embodiment of the present invention.

Referring to FIG. 6, there is illustrated a cross-sectional view of a tripod type constant velocity joint in accordance with a first embodiment of the present invention. In the tripod type constant velocity joint of this embodiment, extended portions P' and Q' are formed at a right upper end and a left lower end of the contact groove 22, respectively, so that a left upper end and a right lower end of the cylindrical roller 27 are in contact with a left upper end contact point A4 and a right lower end contact point A2 of the contact groove 22, respectively, or a right upper end and a left lower end of the cylindrical roller 27 are in contact with a right upper end contact point A3 and a left lower end contact point A1 of the contact groove 22, respectively.

In the first embodiment of the present invention, when assuming that a segment $0_1 0_1$ represents a center line of the right guide surface P of the contact groove 22, a segment $0_2 0_2$ represents a center line of the left guide surface Q of the contact groove 22 and a segment $00$ represents a center line of the cylindrical roller 27, the center lines of the right and left guide surfaces P and Q are offset from the center line of the cylindrical roller 27 by distances $\delta_1$ and $\delta_2$, respectively.

Figure 7:
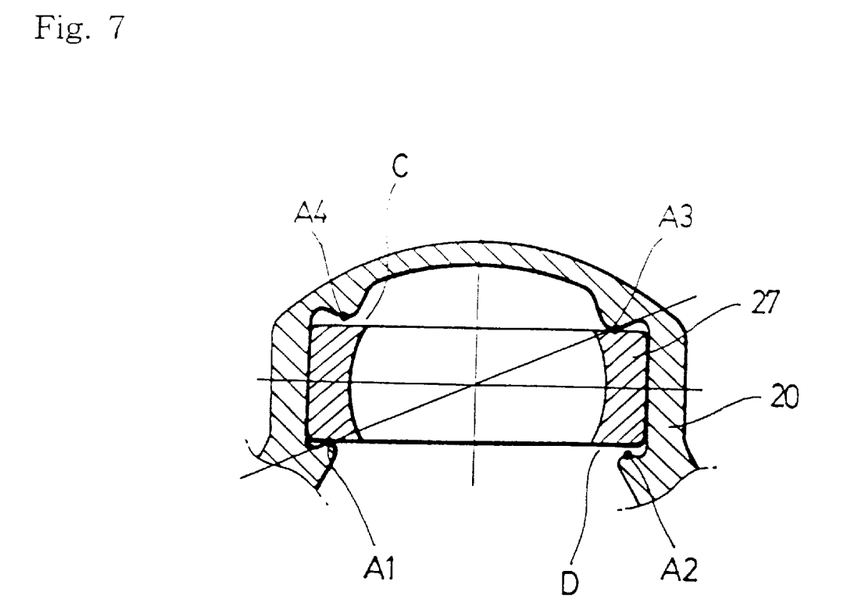
FIG. 7 is a cross-sectional view of a tripod type constant velocity joint in accordance with a second embodiment of the present invention.
Figure 7A:
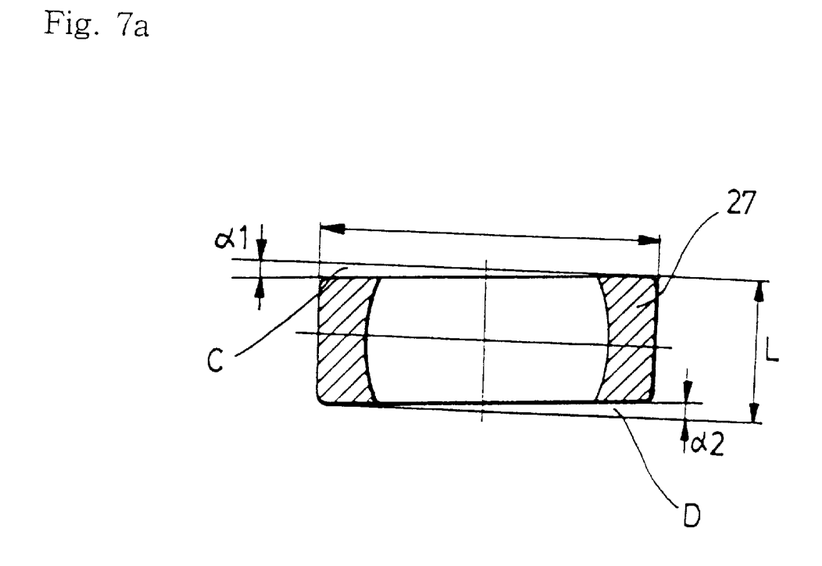
FIG. 7a is a cross-sectional view of a cylindrical roller used in the joint of FIG. 7.

Referring to FIGS. 7 and 7a, there is illustrated a tripod type constant velocity joint in accordance with a second embodiment of the present invention. In the tripod type constant velocity joint of this embodiment, the contact groove 22 is maintained as it is without being changed in its configuration. In this embodiment, a first inclined portion C having a downward inclination angle of $\alpha_1$ is formed on the upper end of the cylindrical roller 27, and a second inclined portion D having an upward inclination angle of $\alpha_2$ is formed on the lower end of the cylindrical roller 27. Accordingly, also in this embodiment, the left upper end and the right lower end of the cylindrical roller 27 are in contact with the left upper end contact point A4 and the right lower end contact point A2 of the contact groove 22, respectively, or the right upper end and the left lower end of the cylindrical roller 27 are in contact with the right upper end contact point A3 and the left lower end contact point A1 of the contact groove 22, respectively.

Figure 8:
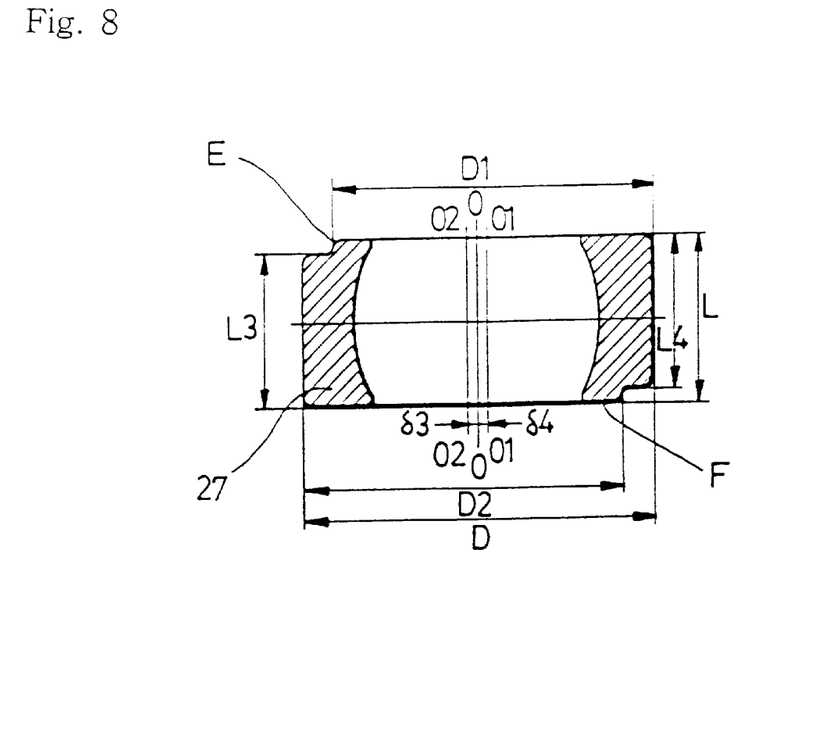
FIG. 8 is a cross-sectional view of a cylindrical roller in accordance with a third embodiment of the present invention.
Figure 8A:
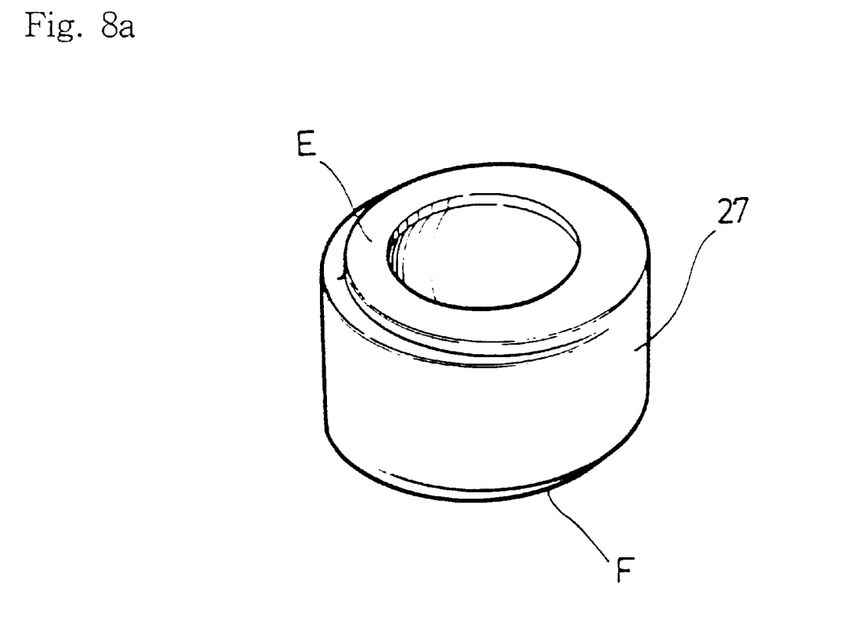
FIG. 8a is a perspective view illustrating the cylindrical roller of FIG. 8.

Referring to FIGS. 8 and 8a, there is illustrated a tripod type constant velocity joint in accordance with a third embodiment of the present invention. In the tripod type constant velocity joint of this embodiment, the contact groove 22 is also maintained as it is without being changed in its configuration. In this embodiment, a left half of the upper end of the cylindrical roller 27 is circumferentially cut out to define a first protrusion E such that the left half of the cylindrical roller 27 is shortened in its length at its upper end, and a right half of the lower end of the cylindrical roller 27 is circumferentially cut out to define a second protrusion F such that the right half of the cylindrical roller 27 is shortened in its length at its lower end. Accordingly, also in this embodiment, the left upper end and the right lower end of the cylindrical roller 27 are in contact with the left upper end contact point A4 and the right lower end contact point A2 of the contact groove 22, respectively, or the right upper end and the left lower end of the cylindrical roller 27 are in contact with the right upper end contact point A3 and the left lower end contact point A1 of the contact groove 22, respectively.

In the third embodiment of the present invention, when assuming that a segment $0_1 0_1$ represents a center line of the upper surface of the cylindrical roller 27, a segment $0_2 0_2$ represents a center line of the lower surface of the cylindrical roller 27 and a segment $00$ represents a center line of the cylindrical roller 27, the center lines of the upper and lower surfaces are offset from the center line by distances $\delta_3$ and $\delta_4$, respectively.

Figure 9A:
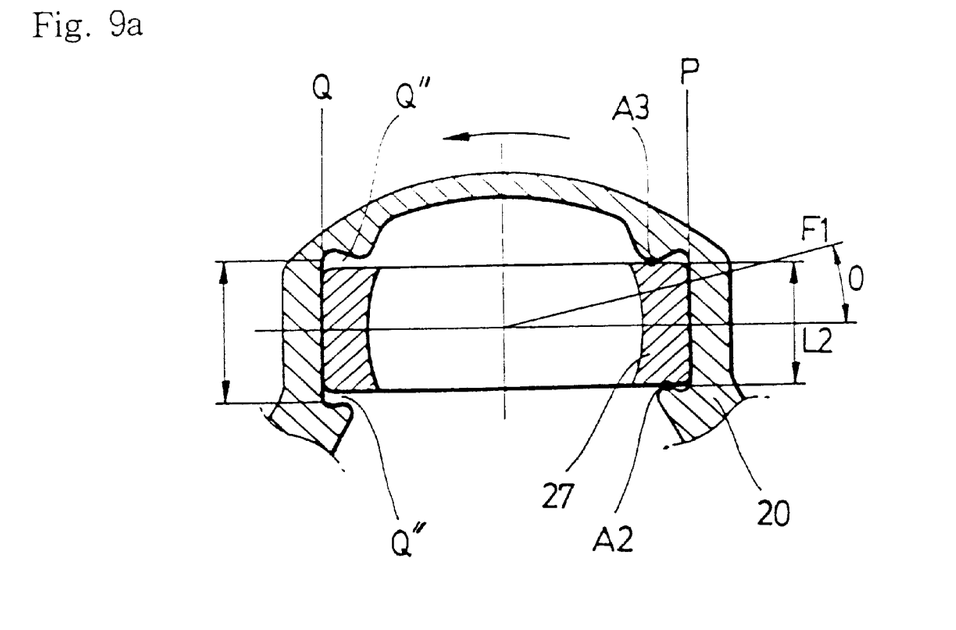
FIGS. 9a and 9b are cross-sectional views of tripod type constant velocity joints in accordance with a fourth embodiment of the present invention.
Figure 9B:
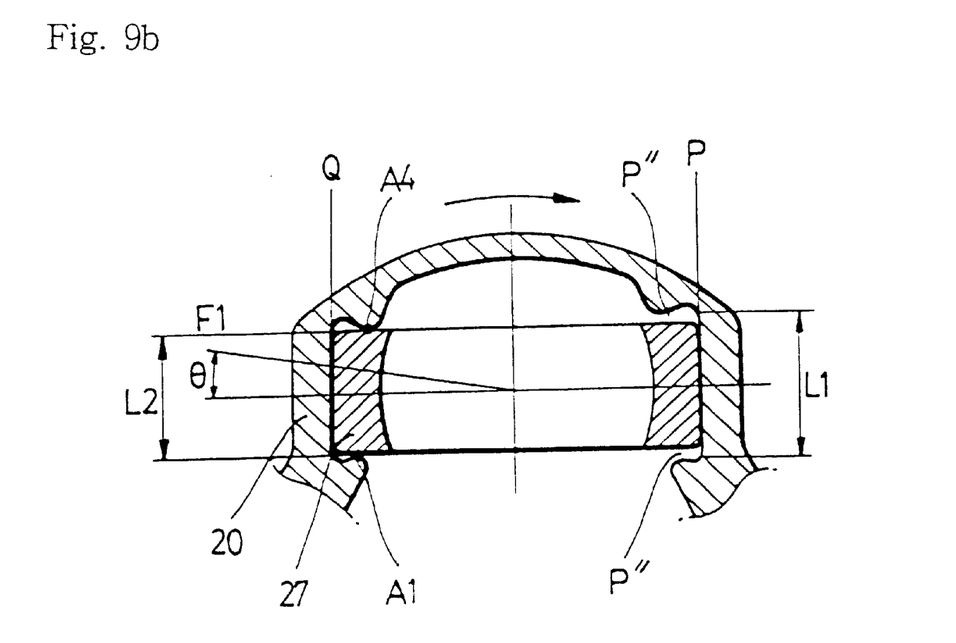
Figure 10:
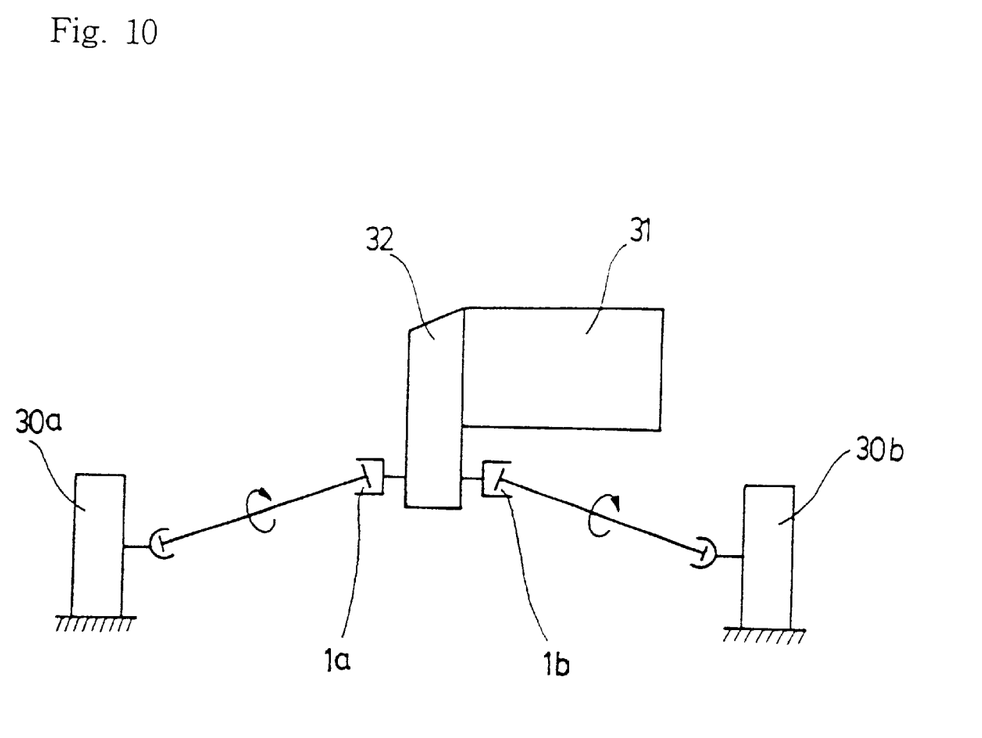
FIG. 10 is a schematic view illustrating a state in which the tripod type constant velocity joint of FIGS. 9a and 9b are mounted to a car.

Referring to FIGS. 9a, 9b and 10, there is illustrated a tripod type constant velocity joint in accordance with a fourth embodiment of the present invention. In the tripod type constant velocity joint of this embodiment, extended portions are formed at one end of the contact groove 22 depending upon a location of the constant velocity joint. When a constant velocity joint 1a is connected to a left drive wheel 30a as shown in FIG. 10, the right guide surface P of the contact groove 22 of the tripod housing 20 is maintained as it is without being changed in its configuration, and extended portions Q" are formed at the left upper end and the left lower end of the contact groove 22, respectively, such that the right upper end and the right lower end of the cylindrical roller 27 are in contact with the right upper end contact point A3 and the right lower end contact point A2, respectively (see FIG. 9a). Also, when a constant velocity joint 1b is connected to a right drive wheel 30b as shown in FIG. 10, the left guide surface Q of the contact groove 22 of the tripod housing 20 is maintained as it is without being changed in its configuration, and extended portions P" are formed at the right upper end and the right lower end of the contact groove 22, respectively, such that the left upper end and the left lower end of the cylindrical roller 27 are in contact with the left upper end contact point A4 and the left lower end contact point A1, respectively (see FIG. 9b). In FIG. 10, the drawing reference numeral 31 represents an engine, and 32 represents a transmission.

By the construction of the tripod type constant velocity joint of the present invention, since the upper end surface and the lower end surface of the cylindrical roller 27 are in contact only with two points of the left lower end contact point A1, the right lower end contact point A2, the right upper end contact point A3 and the left upper end contact point A4 formed in the contact groove 22 of the tripod housing 20 while performing a direction control over a specified angle β, frictional resistance generated between the cylindrical roller 27 and the tripod housing 20 can be reduced.

In other words, in the tripod type constant velocity joint of the present invention, when assuming that $F_1$, $F_2$, $F_3$, and $F_4$ are frictional resistance at the contact points A1, A2, A3 and A4, respectively, and $l_1$, $l_2$, $l_3$, and $l_4$ are distances from a center of the cylindrical roller 27 to the contact points A1, A2, A3 and A4, respectively, since the cylindrical roller 27 comes into contact with the contact groove 22 only at two points as described in the above embodiments, rotational friction moment $M_2$ of the cylindrical roller 27 is described by $M_2=F_1l_1+F_3l_3$, $M_2=F_2l_2+F_4l_4$, $M_2=F_2l_2+F_3l_3$, or $M_2=F_1l_1+F_4l_4$, whereby the rotational friction moment $M_2$ of the present invention is remarkably decreased as compared to the rotational friction moment $M_4$ of the prior art, to thereby reduce the frictional resistance.

In the meanwhile, it is preferable that the tripod housing 20 and the cylindrical roller 27 of the first through fourth embodiments are tapered such that they have surfaces inclined to a predetermined angle.

As a result, by the tripod type constant velocity joint of the present invention, advantages are provided in that since a cylindrical roller comes into contact with a contact groove of a tripod housing only at two points thereby to reduce frictional resistance, noise is diminished through a reliable operation of the tripod type constant velocity joint, endurability of the joint is enhanced and on-board feeling of a passenger is improved, whereby the valuableness of the car is increased.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A tripod type constant velocity joint comprising:

a tripod housing defining an opening, the tripod housing being formed with three track grooves which are communicated with the opening and are uniformly spaced apart from one another in a circumferential direction, each track groove having a contact groove formed in a side wall section thereof, the contact groove having a bottom wall part which defines a guide surface, a spider disposed in the opening of the tripod housing and having three trunnions which project from an outer surface thereof to be inserted into the three track grooves, respectively, and three pairs of a needle roller, a spherical roller and a cylindrical roller, which are sequentially and diametrically fitted around the three trunnions of the spider, respectively, the cylindrical roller being engaged into the contact groove;

wherein one portion of the guide surface of the contact groove is lengthened at its upper end and the other portion of the guide surface of the contact groove is lengthened at its lower end so that a left upper end and a right lower end of the cylindrical roller are in contact with a left upper end contact point and a right lower end contact point which are defined in the contact groove, respectively, or a right upper end and a left lower end of the cylindrical roller are in contact with a right upper end contact point and a left lower end contact point defined in the contact groove, respectively.

2. The tripod type constant velocity joint as claimed in claim 1, wherein the upper end of the cylindrical roller is inclined toward a left portion thereof to a predetermined angle and the lower end of the cylindrical roller is inclined toward a right portion thereof to the predetermined angle so that the upper end and the lower end of the cylindrical roller are in contact with the left upper end contact point and the right lower end contact point defined in the contact groove, respectively, or the right upper end and the left lower end of the cylindrical roller are in contact with the right upper end contact point and the left lower end contact point defined in the contact groove, respectively.

3. The tripod type constant velocity joint as claimed in claim 1, wherein a left portion of the upper end of the cylindrical roller is circumferentially cut out such that the left portion of the cylindrical roller is shortened at its upper end and a right portion of the lower end of the cylindrical roller is circumferentially cut out such that the right portion of the cylindrical roller is shortened at its lower end so that the left upper end and the right lower end of the cylindrical roller are in contact with the left upper end contact point and the right lower end contact point defined in the contact groove, respectively, or the right upper end and the left lower end of the cylindrical roller are in contact with the right upper end contact point and the left lower end contact point defined in the contact groove, respectively.

4. The tripod type constant velocity joint as claimed in claim 1, wherein when the constant velocity joint is connected to a left drive wheel, a left portion of the guide surface is lengthened at its upper and lower ends so that the right upper end and the right lower end of the cylindrical roller are in contact with the right upper end contact point and the right lower end contact point defined in the contact groove, respectively, and when the constant velocity joint is connected to a right drive wheel, a right portion of the guide surface is lengthened at its upper and lower ends so that the left upper end and the left lower end of the cylindrical roller are in contact with the left upper end contact point and the left lower end contact point defined in the contact groove, respectively.

5. The tripod type constant velocity joint as claimed in claim 1, wherein the tripod housing and the cylindrical roller are tapered such that they have surfaces inclined to a predetermined angle.

* * * * *